(No Model.)
H. HECKEL.
ART OF MAKING SOAP STOCK FROM FATS.
No. 255,505. Patented Mar. 28, 1882.
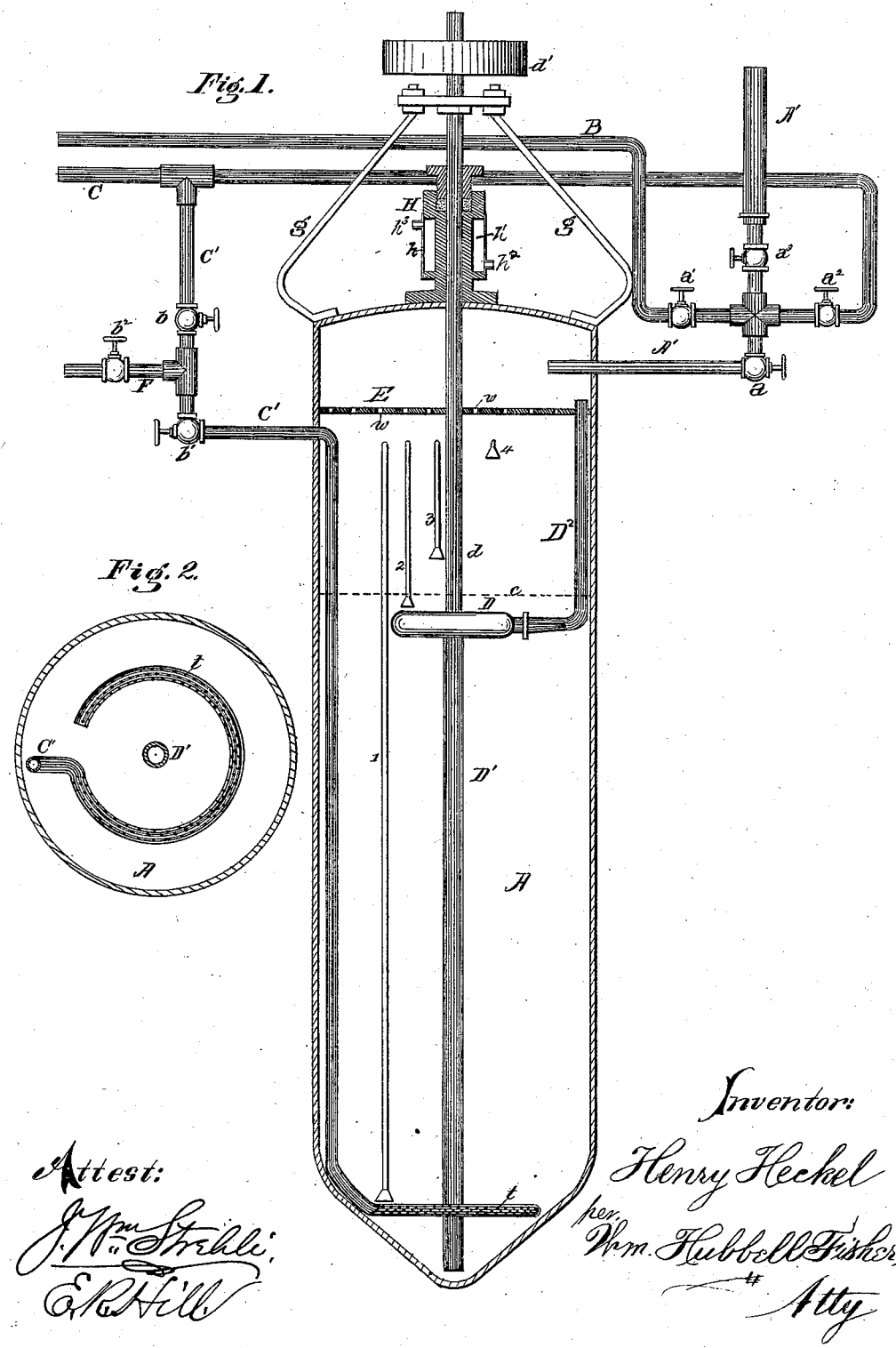

United States Patent Office.

HENRY HECKEL, OF CINCINNATI, OHIO.

ART OF MAKING SOAP FROM FATS.

SPECIFICATION forming part of Letters Patent No. 255,505, dated March 28, 1882.

Application filed November 17, 1881. (No model.)

*To all whom it may concern:*

Be it known that I, HENRY HECKEL, of the city of Cincinnati, county of Hamilton, and State of Ohio, have invented certain new and useful Improvements in the Art of Making Soap from Fats, and Apparatus for Practicing such Improvements, of which the following is a specification.

This invention relates to the manufacture of soap from fats. The practice now is to saponify fats with alkalies without any previous treatment of the fat looking to preliminary decomposition of the same. The result is a comparatively slow saponification, and all the glycerine which does not remain in the soap mechanically suspended is carried off in the waste alkaline solution and lost. Attempts have been made to recover glycerine from the waste alkaline solution of soap-factories, but have been attended with no practical success.

The object of my invention is to prepare fats for instant saponification, and to save all the glycerine. To this end my invention consists of the preliminary extraction of the glycerine from fats in their neutral condition by the direct action of steam and water under a pressure of about one hundred and fifty pounds, whereby a soap-stock is produced susceptible of instant saponification by compounding it with an alkali or alkaline solution. Besides the important advantage of saving all the glycerine from the fats, the whole process of soap-making is materially shortened by the practice of my invention; and I have also found by actual tests that soap made from fats according to it is of better quality, all other things being equal, than soap made from fats according to the old process.

The annexed drawings illustrate one form of apparatus by which fats may be prepared for saponification in accordance with my invention.

In the drawings, Figure 1 represents a central longitudinal section through the tank or digester in which the process is carried on. Fig. 2 represents a cross-section of the tank near the bottom, to show the arrangement of the pipes near the bottom.

A is the tank or digester, in the upper part of which is located a diaphragm provided with perforations $w$. The bottom of the tank is made somewhat conical in shape, as shown in the drawings. The fats or oils to be decomposed are introduced into the digester A through the inlet-pipe A' (by opening the valves $a^3$ and $a$) until the tank is about one-half full, when the valves $a$ $a^3$ are closed. The valves $b$ $b'$ are now opened, permitting steam from a boiler to enter the digester through the pipes C C'. The pipe C' passes to the bottom of the digester, where its lower end is preferably coiled horizontally, as shown in Figs. 1 and 2. The lower end of this pipe C' is provided with perforations $t$, through which the steam escapes into the digester. The steam entering at the bottom passes upwardly through the digester, keeping the oil or fat of a uniform temperature throughout. The steam is kept passing in until the pressure within the digester is nearly equal to that within the boiler, which should be at least one hundred pounds to the square inch. The valves $a'$ and $a$ are now opened and hot water from a boiler is introduced into the digester through the pipes B and A'. Enough hot water is introduced to bring the level of the fat and water to about the line $c$, when the valves $a$ $a'$ are closed. The fact that the mixture has reached this point is determined by the escape of liquid from a try-cock located outside of the digester, and connected by a suitable pipe to the end of pipe 2, located within the boiler. The inner end of this try-pipe 2, as well as the inner ends of try-pipes 1, 3, and 4, is preferably provided with a strainer, as indicated in Fig. 1.

Try-pipes 1, 2, 3, and 4 are at different levels within the digester, and are provided on the outside of the digester with try-cocks, and by means of them the level of the mixture in the digester may be ascertained, as is ordinarily done in steam-boilers.

Within the digester, just below the level $c$, is placed a centrifugal or rotary pump, D, operated by the shaft $d$, which receives its motion from any ordinarily-constructed gearing—such as the pulley $d'$. (Shown in Fig. 1.) The shaft $d$ is held in position by braces $g$, and to make the joint with the digester tight passes through the stuffing-box H. The lower portion of the stuffing-box H is surrounded by the casing $h$, forming the chamber $h'$, into which cold water, to prevent box H from becoming overheated, is introduced at $h^2$, passing out at $h^3$. D' is the influent-pipe of the pump D. It reaches nearly to the bottom of the digester. The pump D discharges through the pipe $D^2$, which passes nearly to the top of the digester.

It is now necessary to return to the description of the operation, which was interrupted after the description of charging the digester.

The rotary pump D is now set in motion, and the water, which, being heavier than the oil, has settled to the bottom, is thrown into the upper part of the digester, falling on the perforated diaphragm E, from which it falls in a finely-divided state on the fat beneath. The pump continuing in action, a gradual mixture of the oil and water takes place, until finally a perfect emulsion is formed. While the process of emulsifying the fat is proceeding the valves $b$ $b'$ are open, letting steam enter, which preserves a uniform temperature throughout the mass, and also keeps the latter under a heavy pressure, which is preferably about one hundred and fifty pounds to the square inch. The steam thus introduced is partially condensed, thereby raising the level of the liquid.

The height to which the liquid is permitted to rise is determined by the cocks attached to the try-pipes 3 and 4. The mixture should not be permitted to rise above the level of try-pipe 3, as the space above is necessary to secure the fine division of the water falling through the diaphragm E, and also that the emulsion may come in contact with the steam after leaving the diaphragm and after being finely divided. If the liquid or emulsion rises to this point, a portion of it is drawn off in the following manner: The pump is stopped and valve $b$ closed and valves $a$ $a^2$ opened, so as to keep up the pressure of steam within the digester. The water will then settle to the bottom of the digester when valve $b^2$ is opened, and the pressure within the digester forces the water out through pipes C' and F into a suitable receiving-vessel. Sufficient water having been withdrawn, valves $a$, $a^2$, and $b^2$ are closed, valve $b$ opened, and the pump again started.

When the operation of pumping and mixing has been carried on for a sufficient length of time (about seven hours being required by my apparatus when the pressure is as low as one hundred and fifty pounds to the square inch, and a shorter time when the pressure is more than one hundred and fifty pounds per square inch, and which period can be ascertained by subjecting some of the liquid to the proper tests) the motion of the pump is stopped and the liquid allowed to remain at rest a short time, the pressure within the digester being kept up, however, by opening valves $a^2$ and $a$, and closing valve $b$. The water containing the glycerine will now gradually separate from the other portion and settle to the bottom.

By the above-described operation the glycerine has been separated from its combination with the fats or oils, and is taken up by the water and remains in solution in it as the latter settles to the bottom of the digester, leaving other parts in the upper part of the digester. When the water containing the glycerine in solution has separated from the fat or oils and settled to the bottom of the digester is determined by examining some of the fluid drawn off through pipe 1. The valves $b'$ $b^2$ are now opened, and the solution of glycerine is forced through the pipe C' and F into a suitable receptacle. When the other portion of the fat begins to come over they are directed into another receptacle. The drawing off of the glycerine and the balance of the product is effected by pressure continually kept up in the digester, the valves $a$ $a^2$ being open. We now have the glycerine separated from the fat. The solution of the glycerine is conveyed to evaporating-pans, where the water is evaporated, and the glycerine remains in a crude state.

The residue is soap-stock ready for immediate and instant saponification by compounding it with alkali or an alkaline solution. If the saponification is to be effected in the ordinary iron kettle now generally used by soap-makers for that purpose, the alkaline solution should be first introduced into the kettle and started aboiling, and then the soap-stock gradually added, preferably by showering it into the kettle by means of a trough provided with numerous perforations. If the acid soap-stock were first introduced into an iron kettle, as is customary now, not only would the latter be attacked and injured by the stock, but the color of the soap would also be darkened, as a result of such attack. Hence it is desirable to saponify the stock before it comes in contact with the iron kettle, and that is effected by proceeding as above directed.

The showering of the stock into the alkaline solution is not essential, but will be found advantageous in that it insures a smooth saponification and prevents lumpiness.

Placing the pump inside dispenses with a number of joints, and prevents cooling of the pump and its connections and the consequent cooling of the mixture.

I have mentioned a pressure of one hundred and fifty pounds, representing 352° Fahrenheit. In actual practice I have used a pressure varying from one hundred and fifty pounds to one hundred and sixty pounds, which has given perfectly satisfactory results; but I desire it to be understood that the pressure may be much below or much above that given and actually used by me, the process being protracted by using a less pressure and accelerated by using a greater pressure.

What I claim as new and of my invention, and desire to secure by Letters Patent, is—

1. The improvement of the art of making soap from fats, which consists of first extracting the glycerine from such fats in their neutral condition by the direct action of steam and water under a pressure of about one hundred and fifty pounds, (so that the use of any chemicals is not necessary,) and then saponifying the resultant stock, substantially as before set forth.

2. The improvement of the art of separating glycerine from fats, which consists in heating the fat in admixture with water by the direct action of steam under a pressure of about one hundred and fifty pounds, and showering the heated admixture through a confined volume of steam under pressure, substantially as before set forth.

3. In a digester for decomposing fats, the combination of a perforated diaphragm located and operated in the steam-space and above the fat and water line of the digester, the circulating-pump D, with its suction-pipe D' and discharge-pipe D², all within the digester, and perforated steam-pipe C', by which the steam is directed in jets into and caused to flow up through the mass, substantially as before set forth.

HENRY HECKEL.

Witnesses:
E. R. HILL,
J. WM. STREHLI.